INVENTOR.
WILLEM LANKREIJER
BY
AGENT

INVENTOR.
WILLEM LANKREIJER
BY
Frank R. Trifari
AGENT 3,448,407

CATHODE CURRENT REGULATED HIGH FREQUENCY OSCILLATOR

Willem Lankreijer, Emmasingel, Eindhoven, Netherlands, assignor to North American Philips Company, Inc., New York, N.Y., a corporation of Delaware Filed July 26, 1966, Ser. No. 568,039
Claims priority, application Netherlands, Aug. 28, 1965, 6511265
Int. Cl. H03b *5/08, 5/18*
Int. Cl. 331—167 12 Claims

ABSTRACT OF THE DISCLOSURE

A high frequency power oscillator includes a plurality of series connected control transistors connected in series with the oscillator electron tube in the cathode circuit. The output power of the oscillator is controlled over a wide range by coupling a source of adjustable current to the base electrode of each transistor. Amplitude control can be obtained by controlling the source of current with a feedback coupling from the output of the oscillator.

The present invention relates to a high-frequency heating apparatus in which the output power can be varied over a wide range while maintaining good frequency stability. The apparatus comprises an electron tube operating as an oscillator having a resonant circuit included in the anode circuit. A feedback voltage is derived from the resonant circuit and is applied through a feedback circuit to the grid of the electron tube. The electron tube oscillator may be constructed in various ways, for example, as a Colpitts circuit, a Hartley circuit, or a similar circuit suitable for inductive or capacitive heating.

In some practical applications of a high-frequency heating apparatus there is a need for a rapid electronic wide range control of the usually high output power, for example, of several kilowatts or several tens of kilowatts. Such a power control may be desired for purifying germanium or silicon or for the progressive hardening of steel.

An object of the invention is to provide electronic control means for the output power of such a high frequency heating apparatus over an extremely wide control range, for example from 1–100, and in spite of this wide control range, continually generating power without the occurrence of any disturbing instabilities. In addition, the following advantages are obtained in conjunction:

(1) A decrease in output power is accompanied by a simultaneous drop of the anode dissipation and the grid dissipation in the electron tube;

(2) Throughout the control range the oscillator frequency of the electron tube oscillator remains substantially constant;

(3) The power control device can be incorporated into a system without the need for changing the existing heating apparatus.

The device according to the invention features a control transistor connected in the cathode circuit of the electron tube so that its emitter-collector path is connected in series with the electron tube. There is further provided an adjustable control current source for obtaining a control current which is supplied through a control circuit to the base electrode of the control transistor.

The power control thus achieved by control current only can be obtained by transistors owing to their characteristic properties, especially the fact that a transistor is capable of conducting very high currents through the emitter-collector path and the fact that with these very high currents the emitter-collector voltage can drop to extremely low values, for example a few tenths of a volt, without markedly affecting these currents (saturation effect). As a result, with this power control the maximum output power of a noncontrolled type of electron tube oscillator can be achieved.

In a particularly advantageous embodiment of the device according to the invention, the cathode circuit of the electron tube includes the series combination of a number of control transistors. The control current is supplied through separate control circuits to the base electrodes of the various control transistors. In parallel with the series combination of the control transistors there is connected a voltage divider consisting of resistors for obtaining an additional control current which is supplied to the base electrode of a control transistor for compensating mutual inequalities in the series combination of the control transistors.

The invention and its advantages will now be described more fully with reference to the accompanying drawing, in which.

Figure 1:
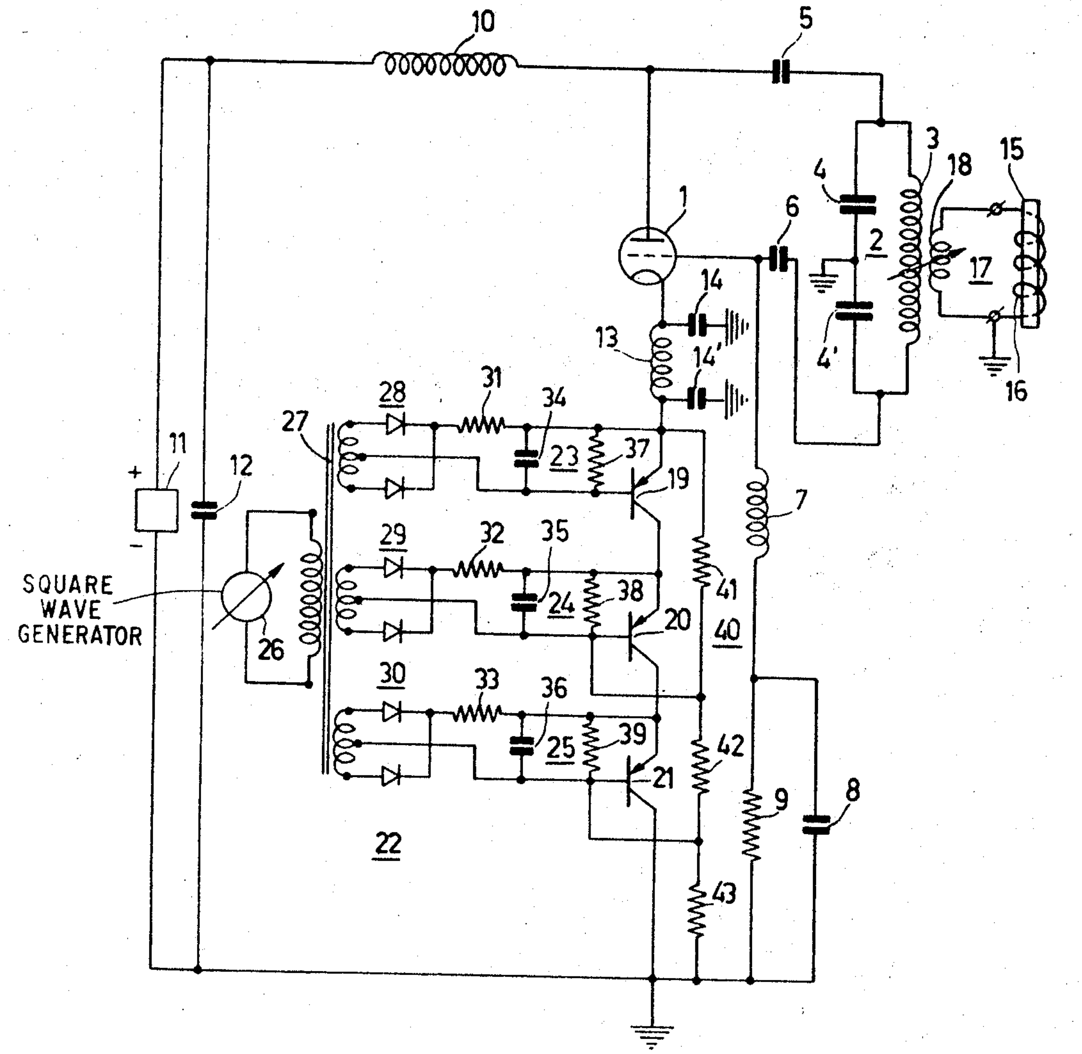
FIG. 1 shows a device embodying the invention.

In the high-frequency heating apparatus shown in FIG. 1, the high-frequency energy required for heating is derived from a grid-controlled electron tube oscillator having a triode 1 connected in class C. The anode circuit of the Colpitts oscillator includes a resonant circuit 2 which determines the oscillator frequency, and which is formed by a tuning coil 3 shunted by two series-connected circuit capacitors 4 and 4'. One end of the resonant circuit 2 is connected through a separation capacitor 5 to the anode and the other end is connected through a grid capacitor 6 to the control grid of the tube 1. The grid is connected to ground via the series combination of a high frequency choke 7 and a resistor 9, shunted by a capacitor 8. The junction of the capacitors 4 and 4' is also connected to ground.

The anode of the tube 1 is energized via a high frequency choke 10 from a direct current supply 11, which is shunted by a high-frequency decoupling capacitor 12. The cathode circuit of the tube includes a high-frequency decoupling network formed by a $\pi$-section consisting of a series coil 13 and the transverse capacitors 14 and 14'.

The oscillatory current which occurs in the resonant circuit 2 during operation is utilized for heating a work piece 15 located in a heating coil 16 that is part of a load circuit 17. The unilaterally grounded heating coil 16 is connected for this purpose to the output terminals of a coupling coil 18, inductively connected with the tuning coil 3. For load matching purposes, the inductive coupling between the tuning coil 3 and the coupling coil 18 is made variable.

In order to control within very wide limits the power supplied by the electron tube oscillator to the load, the cathode circuit of the electron tube 1 includes, in accordance with the invention, the series combination of three control transistors 19, 20, 21. The emitter-collector paths of the transistors are connected in series with the electron tube 1. There is also provided a variable control current source 22 for obtaining a control current which is supplied through separate control circuits 23, 24, 25 to the base electrodes of the various control transistors 19, 20, 21, respectively.

In the embodiment shown, the control current source 22 is formed by an alternating-voltage generator 26 that comprises a square wave voltage generator of variable amplitude. The generator is connected to the primary winding of a transformer 27 having three mutually separated secondary windings, each of which is connected via a push-pull rectifier 28, 29, 30, followed by a smoothing filter formed by the series resistors 31, 32, 33 and a transverse capacitor 34, 35, 36, respectively, to a separate control circuit 23, 24, 25, respectively. Each control circuit 23, 24, 25 is connected to a control transistor 19, 20, 21, respectively between the base electrode and the emitter electrode. A leakage resistor 37, 38, 39 is connected between said electrodes. The difference between the direct voltage levels of the control transistors 19, 20, 21 requires a D.C. separation between the control circuits 23, 24, 25 which is achieved herein by the separate construction of the secondary windings of the transformer 27.

The device so far described operates as follows:

The starting point is a state in which by the rectification of a given square wave voltage from the generator 26 in each of the pushpull rectifiers 28, 29, 30, a given direct current is produced which controls, as a control current, each of the supposedly identical control transistors 19, 20, 21 at the base electrode in an identical manner. As a result, a D.C. collector current passes through the series-connected emitter-collector paths of the transistors 19, 20, 21. The value of said current is mainly determined by the supplied base control current and the current amplification factor of the collector current with respect to the base current. This D.C. collector current forms the D.C. cathode current of the electron tube 1, which consequently adjusts itself so that the D.C. cathode voltage associated with the D.C. cathode current appears across the series combination of the transistors 19, 20, 21. The cathode voltage is determined practically completely by the D.C. supply voltage, the tube characteristics and the load on the electron tube 1. Each of the transistors 19, 20, 21 develops the same fraction of the overall D.C. cathode voltage, for example, in this embodiment one third. The electron tube oscillator then supplies to the load circuit 17 a given high-frequency power which corresponds to this adjustment of the electron tube 1.

If, in this device, the value of the square wave voltage is varied, the D.C. cathode current and hence the D.C. anode current of the electron tube 1 will vary in the same sense. For this variation of the D.C. anode current, the high-frequency power supplied to the load circuit 17 will vary in the same sense over a very wide power range, which can be attributed to the fact that with a class C connected electron tube oscillator with constant load, the A.C. anode current component of oscillator frequency forms a directly varying function of the D.C. anode current. The variation of the D.C. anode current is accompanied by a simultaneous variation of the D.C. cathode voltage, which is always distributed uniformly over the transistors 19, 20, 21, as stated above. This voltage is practically completely determined by the D.C. supply voltage, the tube characteristics and the load on the electron tube 1.

When the square wave voltage is reduced, the base control current will diminish, so that the D.C. anode current decreases. This will result, due to said directly varying relationship, in a like decrease of the A.C. anode current component of oscillator frequency, and hence also of the high-frequency power supplied to the constant load, since the output power is determined by the square of the A.C. anode current component of oscillator frequency multiplied by the constant load.

Conversely, an increase of the square wave voltage produces an increase of the D.C. anode current which is attended by an increase in the high-frequency power supplied to the load. It is even possible to attain the maximum output power of a non-controlled electron tube oscillator by increasing the square wave voltage to a level such that the D.C. anode current associated with said power can be obtained. The foregoing is possible due to the characteristic properties of transistors, in which case the D.C. cathode voltage appearing across the series combination of the transistors 19, 20, 21 with this D.C. cathode current of high value may drop to extremely low values, for example, to a few tenths of a volt per transistor, without markedly affecting this current.

The cathode current control described above, which requires relatively little control power, provides power control over a very wide range. The upper limit is given by the maximum output power of the non-controlled tube oscillator and the lower limit is a minimum power practically equal to zero. In spite of this wide control range there is no risk of transgression of the maximum permissible electron tube dissipation, since it is found that a decrease in output power is accompanied by a simultaneous drop of the anode dissipation and grid dissipation.

With this particularly advantageous power control it is furthermore found that throughout the complete control range, no instabilities occur, for example, in the form of undesirable relaxation phenomena, and substantially no influence on the oscillator frequency occurs, since with this power control only the tube adjustment is varied and the further components of the oscillator remain unchanged.

Therefore, the power control device described above can be incorporated into existing heating apparatus without extensive modification thereof.

In the high-frequency heating apparatus described above, the series combination of the transistors has to receive the D.C. cathode voltage associated with a given D.C. cathode current and to dissipate the power given by the D.C. cathode current multiplied by the D.C. cathode voltage. In accordance with the number of transistors of the series combination, each transistor receives a fraction of the overall D.C. cathode voltage and dissipates a corresponding fraction of the power. This fraction of the voltage and the dissipation should not exceed the maximum permissible value for each transistor. If it is assumed that the transistors and their controls are identical, the distribution is uniform over the various transistors both for the D.C. cathode voltage and the dissipation. The maximum values thereof will determine the minimum number of transistors required. However, in practice, unavoidable tolerances give rise to deviations from such a uniform distribution over the transistors. As a result, a number of transistors exceeding this minimum number has to be included in the series combination because otherwise one or more transistors of the series combination might be loaded in excess of the value allowed for each transistor.

In order to obviate the effect of tolerances and to reduce in this way the number of transistors, there is provided, according to a further aspect of the invention, a voltage divider 40 connected in parallel with the series combination of the control transistors 19, 20, 21. The purpose thereof is to obtain an additional control current which is supplied to the base electrode of a control transistor for compensating the influence of inequalities of the series combination. In the embodiment shown, this voltage divider 40 is formed by the series combination of a number of identical resistors 41, 42, 43 equal to the number of control transistors 19, 20, 21. Viewed from the cathode of the electron tube 1, the junction of each pair of two consecutive series resistors (41, 42; 42, 43) is connected to the base electrode of a further transistor (20; 21) in the series combination of the control transistors 19, 20, 21.

With a uniform voltage distribution across the transistors 19, 20, 21, and among the voltage divider resistors 41, 42, 43, the voltages at the junctions of the consecutive voltage divider resistors (41, 42; 42, 43) are equal to the voltages at the emitter electrodes of the consecutive transistors (20; 21) apart from the very low emitter-base voltage associated with transistors. If the transistors 19, 20, 21 exhibit a deviation from this uniform voltage distribution, an additional control current will flow to the base electrodes through the conductors connecting each junction of two consecutive voltage divider resistors (41, 42; 42, 43) to the base electrode of the next transistor (20; 21). The amplitude and the polarity of said current is dependent upon the amplitude and the polarity of the voltage deviation from the uniform voltage distribution. This additional control current greatly reduces the prevailing deviation irrespective of its cause, i.e. whether this deviation is due to tolerances of the transistors themselves or to deviations of their controls. The series resistors 31, 32, 33, which form part of the smoothing filters of the push-pull rectifiers 28, 29, 30, operate herein for the circuit of the additional control current as decoupling resistors with respect to the initial control current circuit.

In this way the consecutive control transistors 19, 20, 21 are adjusted by the control curren, which in turn is adjusted by the square wave voltage and supplied to the base electrodes through the separate control circuits 23, 24, 25. The deviations from the uniform voltage distribution across the transistors involved in this adjustment due to tolerances are greatly reduced by the control current derived from the voltage divider 40, so that the various transistors are substantially uniformly loaded and the number of transistors can be reduced. Even the loss of control to one transistor may thus be overcome by the control current derived from the voltage divider 40.

Therefore, a practical embodiment of the improved power control amply described above is particularly attractive from a manufacturing point of view since the tolerances need not fulfil special requirements.

The following data of a 15 kw. high-frequency heating apparatus, according to the invention, tested extensively in practice, are given:

Triode: Philips TBW 6/14.
Control-transistors: 2N 1100 (20 times)
  Maximum permissible current: 15 a.
  Maximum permissible voltage: 65 v.
  Maximum permissible dissipation: 90 w.
Voltage divider resistors: 100 ohms (20 times).
Square wave voltage frequency: 2000 c./s.
Smoothing filter (20 times): Series resistor 100 ohms, transverse capacitor 10 $\mu$f.
Leakage resistors: 100 ohms (20 times).
Power control range: 15 kw. to 0.15 kw.
Total control power for the control transistors: 6 w. to 0 w.
Triode dissipation: 7.5 kw. to 1.5 kw., continuously dropping.
Oscillator frequency: 1.110 mc./s., substantially constant.

It should be noted that the same variation of the output power, of the electron tube dissipation and of the oscillator frequency was determined for various other types of oscillator circuits.

Figure 2:
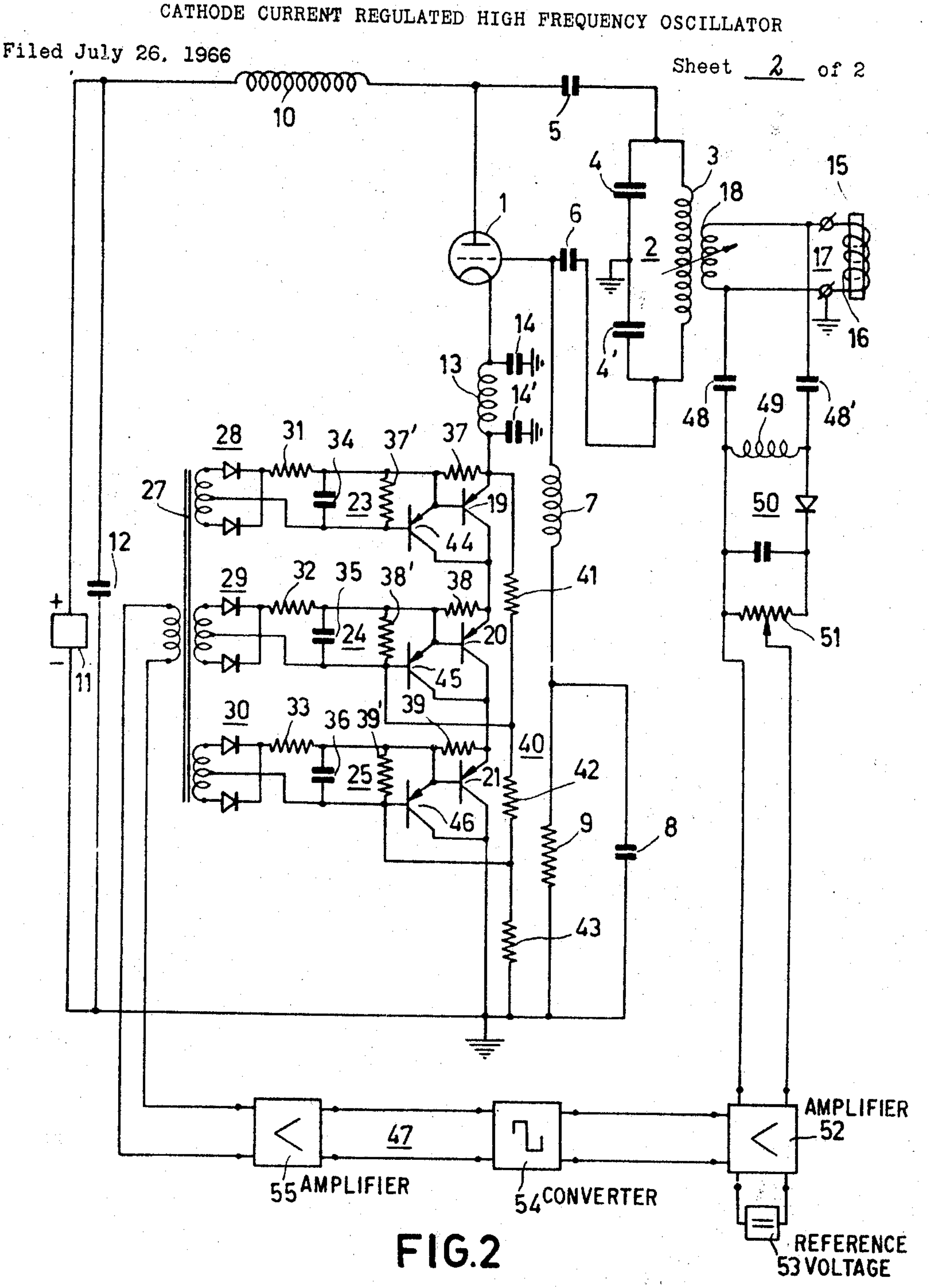
FIG. 2 shows a further embodiment of the invention.

FIG. 2 shows a further embodiment of the high-frequency heating apparatus of FIG. 1. Corresponding elements of FIG. 2 are designated by the same reference numerals as in FIG. 1.

In this high-frequency heating apparatus, each separate control circuit 23, 24, 25 includes an additional control transistor 44, 45, 46, respectively, with the associated base leakage resistors 37', 38', 39', respectively, operating as a current amplifier for the overall control current supplied to the base electrodes of the control transistors 19, 20, 21. The latter current comprises the control current adjusted by the square-wave voltage and the additional control current derived from the voltage divider 40. In this way a more sensitive control of the output power and a reduction of the required control power is obtained, while a still further reduction of deviations from the uniform voltage distribution over the control transistors due to tolerances is obtained. If desired, further control transistors operating as current amplifiers may be included in each control circuit 23, 24, 25.

The control of the output power is utilized to stabilize the voltage across the load circuit. For this purpose, a control voltage is derived from the load circuit 17 and applied to the primary winding of the transformer 27 through a control voltage circuit 47. In this embodiment, the control voltage circuit 47 is provided with an input network formed by the separation capacitors 48, 48' and a choke 49 in between, followed by a rectifier 50 with an associated output resistor 51. The output resistor 51 is connected to a pair of input terminals of a differential voltage amplifier 52, and a reference voltage source 53 is connected to a futrher pair of input terminals. Thus, an output voltage is produced at the output terminals of the differential voltage amplifier 52 which is equal to the difference between the output voltage of the rectifier 50 and the reference voltage multiplied by a given amplification factor. This output voltage is converted in the D.C.-A.C. converter 54 into a square-wave voltage, which, subsequent to amplification in a square-wave voltage amplifier 55, is applied to the primary winding of the transformer 27.

The above-mentioned device accurately stabilizes the voltage across the load circuit 17. If the voltage across the load circuit 17 increases, the square-wave voltage will drop accordingly, and as stated above with reference to FIG. 1, the A.C. anode current also will drop so that the voltage across the load circuit 17 decreases, said decrease counteracting the initial voltage increase. Conversely, if the voltage across the load circuit 17 decreases, the increase in square-wave voltage will raise the A.C. anode current so that the voltage across the load circuit 17 increases, thereby counteracting the initial voltage drop.

In this way a sensitive control of the voltage across the load circuit 17 at a predetermined value is obtained, which value can be rendered adjustable by constructing the output resistor 51 of the rectifier 50 as a voltage divider.

The control may also be used, instead of stabilizing the voltage across the load circuit 17, for the stabilization of the current through the load 17 or of the temperature of the work piece 15. In the latter case for example, a thermo-element is connected to the work piece 15. The output voltage thereof, if necessary subsequent to amplification, is applied to an input of the differential voltage amplifier 52.

It should be noted here that the series combination of the control transistors may, as an alternative, be included in the A.C. cathode current circuit. However, for practical reasons, the embodiment shown is preferred in which the series combination of the control transistors is included in the D.C. cathode current circuit.

I claim:

1. A high-frequency heating apparatus comprising an electron tube connected as an oscillator having a resonant circuit included in the anode circuit in which a feedback voltage is derived, a feedback circuit, means for applying said feedback voltage through said feedback circuit to the grid of the electron tube, at least one control transistor connected in the cathode circuit of the electron tube so that its emitter-collector path is connected in series with the electron tube, an adjustable control current source for producing a control current, a control circuit, and means for supplying said control current through said control circuit to the base electrode of the control transistor so as to vary the tube current and the oscillator output power in the same sense.

2. A high-frequency heating apparatus as claimed in claim 1 wherein the cathode circuit of the electron tube further includes at least one other control transistor connected in series with said one control transistor and wherein the control current is supplied through separate control circuits to the base electrodes of each of the control transistors of the series combination.

3. A high-frequency heating apparatus as claimed in claim 1 wherein said control circuit further includes at least one transistor connected as a current amplifier.

4. A high-frequency heating apparatus as claimed in claim 2 wherein the control current source comprises an A.C. voltage generator variable in amplitude, a transformer having a primary winding and separate secondary windings, a plurality of rectifier circuits and filters, means connecting said A.C. generator to the primary winding of said transformer, and means individually connecting the separate secondary windings through individual ones of said rectifier circuits and said filters to separate ones of said control circuits.

5. A high-frequency heating apparatus as claimed in claim 2 further comprising a voltage divider connected in parallel with the series combination of the control transistors so as to derive a control current which is supplied to the base electrode of one control transistor of the series combination of control transistors.

6. A high-frequency heating apparatus as claimed in claim 5 wherein the voltage divider comprises the series combination of a number of identical resistors equal to the number of control transistors, and, starting from the cathode of the electron tube, means connecting each junction of two consecutive series resistors to the base electrode of the next transistor in the series combination of the control transistors.

7. A high-frequency heating apparatus as claimed in claim 5 wherein each of said control circuits includes a filter having a series resistor for decoupling the control current derived from the voltage divider from the control current flowing through the separate control circuits.

8. A high-frequency heating apparatus as claimed in claim 1 further comprising a high frequency decoupling network connected to the tube cathode and in series with the electron tube so as to pass only the D.C. cathode current.

9. An oscillator circuit for supplying high-frequency power to a load comprising, an oscillator tube having an anode, cathode and grid, a resonant circuit connected to said tube anode, a feedback circuit intercoupling said anode and grid to sustain oscillations, a control transistor connected to the tube cathode so that its emitter-collector current path is in series with the tube anode-cathode current path, a source of adjustable current that is independent of the tube operating voltages, and means for supplying a control current from said current source to the base electrode of said transistor thereby to control the output power of the oscillator tube.

10. An oscillator circuit as claimed in claim 9 further comprising a second control transistor having its emitter-collector current path connected in series with the first control transistor, and isolation means for separately coupling the output of said current source to the base electrodes of said first and second transistors so as to control said transistors in synchronism.

11. An oscillator circuit as claimed in claim 10 wherein said current source comprises an A.C. current source having means for adjusting the current amplitude, said circuit further comprising, a third control transistor connected in series with said first and second transistors, means connecting the base electrode of said third transistor to said current source via said isolation means, a voltage divider connected in parallel with the series combination of the control transistors, and means individually connecting predetermined taps on said voltage divider to the base electrodes of given ones of said control transistors to supply thereto a second control current that compensates for any unequal voltage distribution across said transistors.

12. An oscillator circuit as claimed in claim 9 further comprising a load circuit for coupling the load to the oscillator circuit, and means for coupling a portion of the oscillation voltage in said load circuit to the input of said adjustable current source to control the output current thereof in a sense to oppose variations in the amplitude of the oscillation voltage.

References Cited

UNITED STATES PATENTS 2,584,850 2/1952 De Mers -------- 331—183 X

ROY LAKE, *Primary Examiner.*

S. H. GRIMM, *Assistant Examiner.*

U.S. Cl. X.R.

307—316; 219—10.77; 331—183, 186

PO-1050
(5/69)

UNITED STATES PATENT OFFICE
CERTIFICATE OF CORRECTION

Patent No. 3,448,407 Dated June 3, 1969

Inventor(s) Willem Lankreijer

It is certified that error appears in the above-identified patent and that said Letters Patent are hereby corrected as shown below:

column 2, line 2, after "this" insert -- type of --;

column 5, line 10, after "herein" insert -- as decoupling resistors --;

column 5, line 11, cancel "as decoupling resistors";

column 6, line 9, cancel "futrher" and insert -- further --;

Signed and sealed this 17th day February 1970.

(SEAL)
Attest:

Edward M. Fletcher, Jr.
Attesting Officer

WILLIAM E. SCHUYLER, JR.
Commissioner of Patents